(12) United States Patent
Lalam et al.

(10) Patent No.: US 11,974,222 B2
(45) Date of Patent: Apr. 30, 2024

(54) METHOD FOR SWITCHING OFF A COMMUNICATION NETWORK

(71) Applicant: SAGEMCOM BROADBAND SAS, Rueil Malmaison (FR)

(72) Inventors: Massinissa Lalam, Rueil Malmaison (FR); Laurent Alarcon, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 401 days.

(21) Appl. No.: 17/113,568

(22) Filed: Dec. 7, 2020

(65) Prior Publication Data

US 2021/0195516 A1 Jun. 24, 2021

(30) Foreign Application Priority Data

Dec. 23, 2019 (FR) ...................................... 1915442

(51) Int. Cl.
*H04W 52/02* (2009.01)
*H04W 28/02* (2009.01)
(Continued)

(52) U.S. Cl.
CPC ... *H04W 52/0206* (2013.01); *H04W 28/0257* (2013.01); *H04W 28/12* (2013.01); *H04W 88/10* (2013.01); *H04W 88/14* (2013.01)

(58) Field of Classification Search
CPC ......... H04W 52/0206; H04W 28/0257; H04W 28/12; H04W 88/10; H04W 88/14
See application file for complete search history.

(56) References Cited

U.S. PATENT DOCUMENTS

2016/0309428 A1* 10/2016 Shin .................... H04W 52/386
2019/0096151 A1* 3/2019 Lickfelt ............. G07C 9/00309
(Continued)

FOREIGN PATENT DOCUMENTS

CN  105430757 A * 3/2016 ............ H04W 76/30
CN  108116366 A * 6/2018 ............ B60R 25/20
(Continued)

OTHER PUBLICATIONS

Aug. 20, 2020 Search Report issued in French Patent Application No. 1915442.
(Continued)

*Primary Examiner* — Jeffrey M Rutkowski
*Assistant Examiner* — Christopher Nguyen
(74) *Attorney, Agent, or Firm* — Williams Mullen; R. Brian Drozd

(57) ABSTRACT

A method for switching off a communication network is provided. The communication network includes a plurality of access points coordinated by a master device, where each access point manages a wireless network known as a fronthaul network, and where a station is able to associate itself with a fronthaul network of the communication network. At least one item of information relating to each associated station is obtained from each access point, and, for each station, it is determined as to whether it is present or absent according to association information. A phase of switching off at least one fronthaul network is initiated when all the stations are determined as being absent from the communication network.

13 Claims, 7 Drawing Sheets

(51) Int. Cl.
    *H04W 28/12*     (2009.01)
    *H04W 88/08*     (2009.01)
    *H04W 88/10*     (2009.01)
    *H04W 88/14*     (2009.01)

(56) References Cited

U.S. PATENT DOCUMENTS

2019/0306791 A1    10/2019  Onaka et al.
2019/0380082 A1*  12/2019  Kim .................. H04W 36/0058
2022/0264346 A1*   8/2022  Damnjanovic ....... H04W 72/56

FOREIGN PATENT DOCUMENTS

EP           2787777 A1    10/2014
WO    WO-2019080994 A1 *  5/2019  ............ H04W 16/14

OTHER PUBLICATIONS

"3rd Generation Partnership Project; Technical Specification Group Radio Access Network; Solutions for energy saving within UTRA Node B (Release 12);" Sep. 26, 2014.

\* cited by examiner

METHOD FOR SWITCHING OFF A COMMUNICATION NETWORK

TECHNICAL FIELD

The present invention relates to a method for switching off at least part of a wide-area communication network, the wide-area communication network comprising a plurality of wireless networks referred to as fronthaul networks.

PRIOR ART

In a communication network such as a home network, the use of extenders can extend the range of the home network to remote areas such as various rooms in a house. An extender is an access point of the communication network that manages a wireless network referred to as a fronthaul network with which terminals or stations can be associated and which is moreover connected to a so-called backhaul network. The backhaul network makes it possible to interconnect together the access points of the communication network, whether by cable and/or by wireless.

By disposing, in various rooms in a house, a plurality of access points each emitting a fronthaul network, it is thus possible to provide wireless access to the communication network in various zones. In this way, stations such as a printer, a connected socket, a connected bulb or a television can be connected to the communication network even if they are situated remote from each other. In addition, a mobile station such as a telephone or a tablet can easily remain connected to the communication network while moving in the various rooms in a house.

However, the improvement in coverage of a wireless network permitted by the use of a plurality of extenders broadcasting fronthaul networks gives rise to additional energy consumption and additional emission of electromagnetic radiation that are often unnecessary. This is because a user is not continuously at home. Consequently it is not necessary to continuously maintain all the coverage of the wireless network in an optimum manner.

It is possible to switch off fronthaul networks according to defined time ranges, but this solution may prove to be constraining in a multiuser environment or in cases of use of connected objects requiring connectivity that is not easily predictable.

It is desirable to overcome these drawbacks of the prior art. It is in particular desirable to provide a solution that makes it possible to limit energy consumption and emission of electromagnetic radiation while providing a service affording optimum use according to the user requirements.

DISCLOSURE OF THE INVENTION

One object of the present invention is to propose a method for switching off at least part of a communication network, the communication network comprising a plurality of access points coordinated in a centralised fashion by a master device, the access points and the master device being interconnected with each other by a backhaul network, each access point managing a wireless network known as a fronthaul network, a station being able to be associated with a fronthaul network of the communication network. The method is implemented by the master device and comprises:
 obtaining, from each access point, at least one item of information relating to each station in the communication network associated with said access point or which is dissociated from said access point, said at least one item of information obtained comprising association information indicating with which fronthaul network the station is associated or from which fronthaul network the station is dissociated,
 determining, for each station in the communication network, whether the station is present or absent according to the association information,
 initiating a phase of switching off at least one fronthaul network when all the stations are ab sent.

According to a particular embodiment, said at least one item of information obtained further comprising information representing a signal level received by the access point coming from the station, said method further comprises:
 determining, for each station in the communication network, whether the station is mobile or fixed according to a variation in the received signal level coming from the station,
 determining, for each absent mobile station, the last fronthaul network with which the station was associated according to the association information, said last fronthaul network being said to be critical,
 and wherein initiating a phase of switching off at least one fronthaul network when all the stations are absent comprises initiating a phase of switching off at least one non-critical fronthaul network when all the mobile stations are absent. Thus the reassociation of the mobile stations is facilitated in zones where the probability of reassociation is the highest.

According to a particular embodiment, the step of the method for determining, for each station in the communication network, whether the station is mobile or fixed according to a variation in the received signal level comprises: comparing a standard deviation of a set of a plurality of averages of the received signal level with a predefined threshold, each average being calculated over a period with a duration different from the other periods, and determining that the station is mobile in the case where the standard deviation of all the averages is higher than said threshold and that the station being fixed otherwise.

According to a particular embodiment, determining, for each station in the communication network, whether the station is mobile or fixed according to a variation in the received signal level comprises: comparing an instantaneous value of the received signal level at a given instant with an average value of the received signal level calculated over a period of time preceding said given instant and determining that the station is mobile in the case where the instantaneous value of the received signal level is lower than a difference of the average value minus a first predefined threshold or in the case where the instantaneous value of the received signal level is higher than a sum of the average value and a predefined second threshold.

According to a particular embodiment, the phase of switching off at least one non-critical fronthaul network comprises switching off a non-critical fronthaul network if no station is associated with said non-critical fronthaul network.

Thus the switching off of the fronthaul networks is adapted to the temporary requirements of the associated stations. The power consumption of the communication network and the emission of electromagnetic waves can then be limited while guaranteeing optimum use adapted to the requirements of a user.

According to a particular embodiment, said at least one item of information obtained also comprising information representing a bit rate of data exchanged by said station with an access point and/or information representing a quality of service of the data exchanged by said station with an access point and/or information representing a connection request intended for the station, the method comprises:

> determining, for each fixed station in the communication network, whether said station is managing critical or non-critical traffic, according to said information representing a data rate and/or a quality of service and/or said information representing a connection request,
> and wherein the switching-off phase comprises:
> for each non-critical fronthaul network with which only one or more fixed stations managing non-critical traffic are associated, making an attempt at switching said fixed stations in order to transfer them from their original fronthaul network to another not switched-off fronthaul network.

It is thus possible to reduce the power consumption and the transmission of electromagnetic waves of the communication network without this impairing a quality of service provided to the user by switching off fronthaul networks with which stations are associated when said fronthaul networks are easily replaceable. Furthermore, a station that manages high-rate traffic (i.e. above a given threshold) and/or for which an incoming connection has been identified will remain associated with its original fronthaul network, which has a high probability of providing better conditions for access to said station.

According to a particular embodiment, determining, for each fixed station in the communication network, whether the station is managing critical or non-critical traffic comprises determining that said fixed station is managing critical traffic in the case where at least one following criterion is met: said station is managing traffic having voice and/or video as a quality of service; the number of packets sent and/or received by said station is above a given threshold; connection requests are transmitted to said station.

According to a particular embodiment, the attempt at switching the stations is made, for the stations associated with the non-critical fronthaul networks with which only one or more fixed stations managing non-critical traffic are associated, successively in an order of said fronthaul networks that increases with the number of stations associated with said fronthaul networks, so that switching attempts are first of all made for the stations associated with the fronthaul network the number of associated stations of which is smaller before being made for the stations associated with a fronthaul network the number of associated stations of which is greater.

Thus the switching off of the fronthaul networks with which stations are associated is done gradually and makes it possible to optimise the coverage of the communication network according to the requirements of the stations while minimising the number of fronthaul networks switched on.

According to a particular embodiment, the master device initiates the switching-off phase after a time-delay period commencing as soon as the last station determined as being mobile is determined as being absent.

According to a particular embodiment, the method further comprises, after at least one non-critical fronthaul network has been switched off, switching on the fronthaul networks if a station in the communication network is determined as being mobile and present, a station that connects for the first time to the communication network while associating with a fronthaul network being considered to be mobile by default.

Thus the use of a mobile station is privileged.

According to a particular embodiment, the switching-off phase further comprises attributing a movement indicator to a fixed station transferred during an attempt at switching from their original fronthaul network to another fronthaul network that is not switched off, and wherein the master device, after at least one non-critical fronthaul network has been switched off: switches on all the fronthaul networks in the case where the traffic managed by a station passes from non-critical to critical and if a transfer indicator is attributed to said station.

In a particular embodiment, only the original fronthaul network of said station is switched on in the case where the traffic managed by said station passes from non-critical to critical and if a transfer indicator is attributed to said station.

Thus the switching on of the fronthaul networks is adapted to the change in the traffic of the stations. In addition, it is possible to avoid switching on all the fronthaul networks when a station has remained associated with the fronthaul network in question as providing the best conditions for connection to said station.

According to a particular embodiment, the method comprises sending a listening instruction to an access point managing a switched-off fronthaul network so as to switch on said fronthaul network in listening mode only, and, in the case where at least one association request coming from a non-associated station is received by said access point, switching on said fronthaul network.

Thus a fixed station that was absent at the time of the switching-off phase can reassociate with the communication network even when only switched-off fronthaul networks are potentially accessible to it.

The invention also relates to a master device in a communication network, the communication network comprising a plurality of access points coordinated in a centralised manner by the master device, the access points and the master device being interconnected with each other by a backhaul network, each access point managing a wireless network known as a fronthaul network, a station being able to associate itself with a fronthaul network of the communication network. The master device comprises:

> means for obtaining, from each access point, at least one item of information relating to each station in the communication network associated with said access point or which dissociates itself from said access point, said at least one item of information obtained comprising association information indicating with which fronthaul network the station is associated or from which fronthaul network the station is disassociating itself,
> means for determining, for each station in the communication network, whether the station is present or absent according to the association information,
> means for initiating a phase of switching off at least one fronthaul network when all the stations are absent.

According to a particular embodiment, said at least one item of information obtained further comprising information representing a signal level received by the access point coming from the station, said master device further comprises:

> means for determining, for each station in the communication network, whether the station is mobile or fixed according to a variation in the received signal level coming from the station,
> means for determining, for each absent mobile station, the last fronthaul network with which the station was associated according to the association information, said last fronthaul network being said to be critical,
> and wherein said means for initiating a phase of switching off at least one fronthaul network when all the stations are absent are configured to initiate a phase of switching off at least one non-critical fronthaul network when all the mobile stations are absent.

The invention also relates to a computer program that comprises instructions for implementing, by a processor, the method mentioned above in any one of the embodiments thereof, when said program is executed by said processor.

The invention also relates to an information storage medium storing such a computer program.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1A:
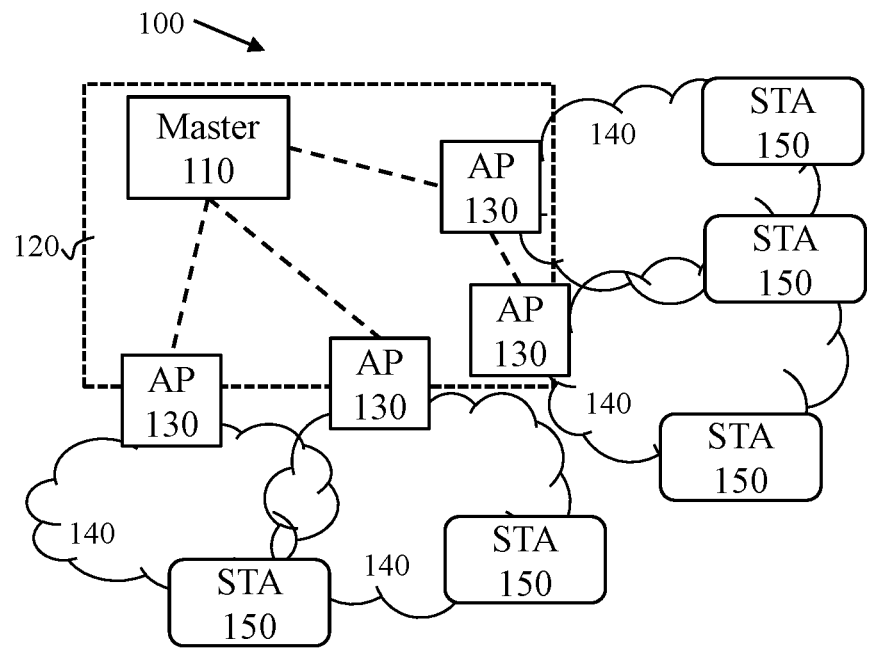
FIG. 1A illustrates schematically a communication network comprising so-called fronthaul networks.

FIG. 1A thus illustrates schematically a communication network 100 wherein a method for switching off at least part of said communication network 100 is implemented.

The communication network 100 comprises a plurality of access points AP 130, each access point AP 130 managing at least one wireless network referred to as a fronthaul network 140. Each fronthaul network 140 can thus cover a geographical zone distinct from the other fronthaul networks 140, which makes it possible to extend the communication network, for example by covering a plurality of rooms in a house. A plurality of access points AP 130 may be co-located in the same item of equipment, each access point AP 130 managing a fronthaul network in a different frequency band (e.g. 2.4 GHz and 5 GHz).

The access points AP 130 are interconnected with each other and interconnected with a master device 110 by a backhaul network 120. The master device 110 coordinates all the access points AP 130. The master device 110 can thus collect data exchanged between any access point AP 130 in the backhaul network 120 and a station 150. The master device 110 can furthermore send, to each access point AP 130, instructions to switch off or switch on a fronthaul network via the backhaul network 120. The master device 110 may or may not itself manage one or more fronthaul networks 140.

A station 150 connects to the communication network 100 by associating itself with a fronthaul network 140 managed by one of the access points AP 130. The station 150 is associated with a fronthaul network 140 after having exchanged messages with the access point AP 130 that manages the fronthaul network 140 according to a conventional association procedure and after having received an association authorisation from said access point AP 130. Each station 150 that is authorised to associate with one of the fronthaul networks 140 of the communication network is identified uniquely in the communication network 100, for example by means of its MAC (media access control) address. The master device 110 can thus recognise a station 150 that is associated with a first fronthaul network 140 and then which, by transferring, associates itself with an adjoining fronthaul network 140. The master device 110 can furthermore recognise a station 150 which, after having disconnected from the communication network by dissociating itself from a fronthaul network 140, reassociates with said fronthaul network 140 or reassociates with another fronthaul network 140.

Figure 1B:
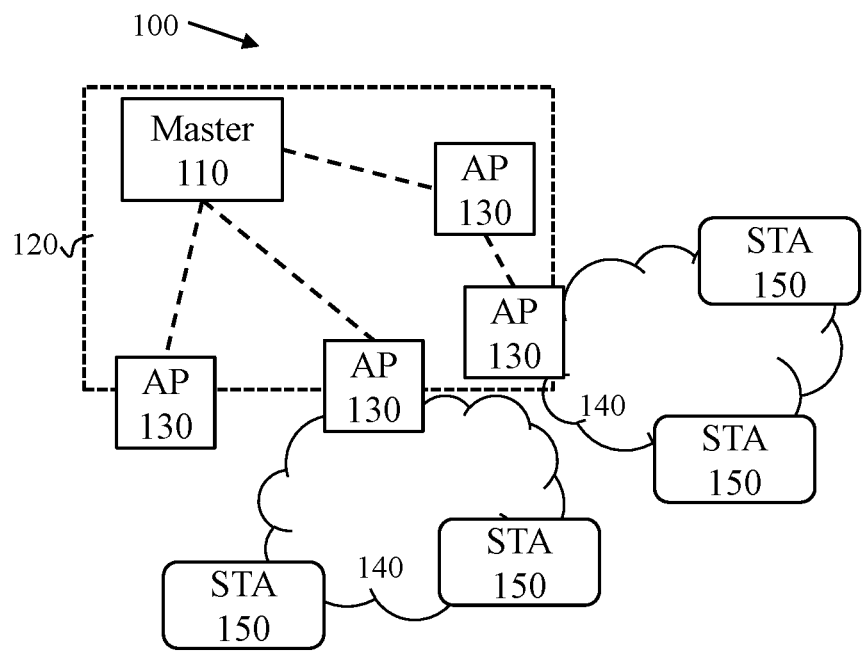
FIG. 1B illustrates schematically the communication network comprising fronthaul networks wherein a part of the fronthaul networks is switched off.

FIG. 1B illustrates schematically the communication network 100 wherein the method for switching off at least part of said communication network 100 is implemented and wherein a part of the fronthaul networks 140 is switched off.

Identically to FIG. 1A, the master device 110 and all the access points AP 130 are interconnected by the backhaul network 120.

However, at least one fronthaul network 140 is switched off. The corresponding access point AP 130 normally managing the fronthaul network 140 switched off thus does not send any corresponding beacon to said fronthaul network 140.

The stations 150 identified in the communication network 100 are associated with the fronthaul networks 140 that have remained switched on.

Figure 2A:
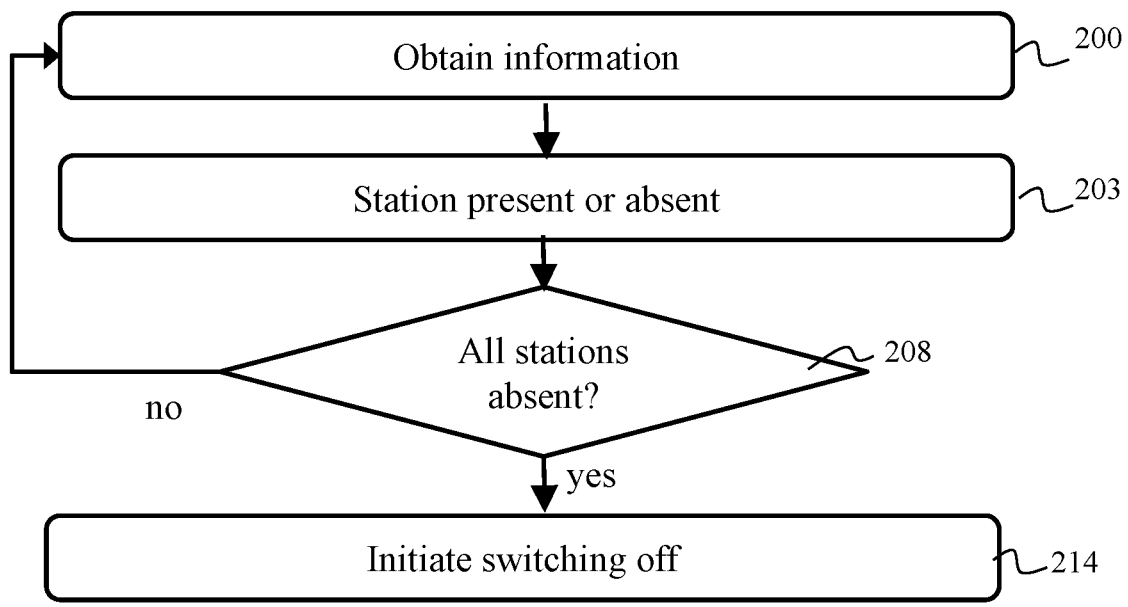
FIG. 2A illustrates schematically a method for switching off at least part of the communication network according to a first embodiment, the switching-off method being performed by a master device of the communication network.

FIG. 2A illustrates schematically the method for switching off at least part of the communication network 100, implemented by the master device 110, according to a first embodiment.

In a first step 200, the master device 110 obtains from the access points AP 130 one or more items of information relating to the stations 150 identified in the communication network 100. For each station, the information relating to the stations 150 identified in the communication network 100 comprise an identification of the station 150 and association information for the station 150. The association information for the station 150 comprises an identification of the fronthaul network 140 with which said station 150 has just associated itself or an identification of the fronthaul network 140 from which the station 150 has just disassociated itself.

In a step 203, the master device 110 determines, for each station 150, whether the station 150 is present or absent. In other words, the master device 110 determines, from the association information, whether at an instant in question a station 150 is associated with a fronthaul network 140 or disassociated from any fronthaul network 140.

In a step 208, the master device 110 identifies whether all the stations 150 are absent. If at least one station 150 is present, the master device 110 reiterates steps 200 to 203. If there is no longer any station 150 present, the master device 110 performs a step 214.

In the step 214, the master device 110 initiates a phase of switching off at least one fronthaul network 140.

Figure 2B:
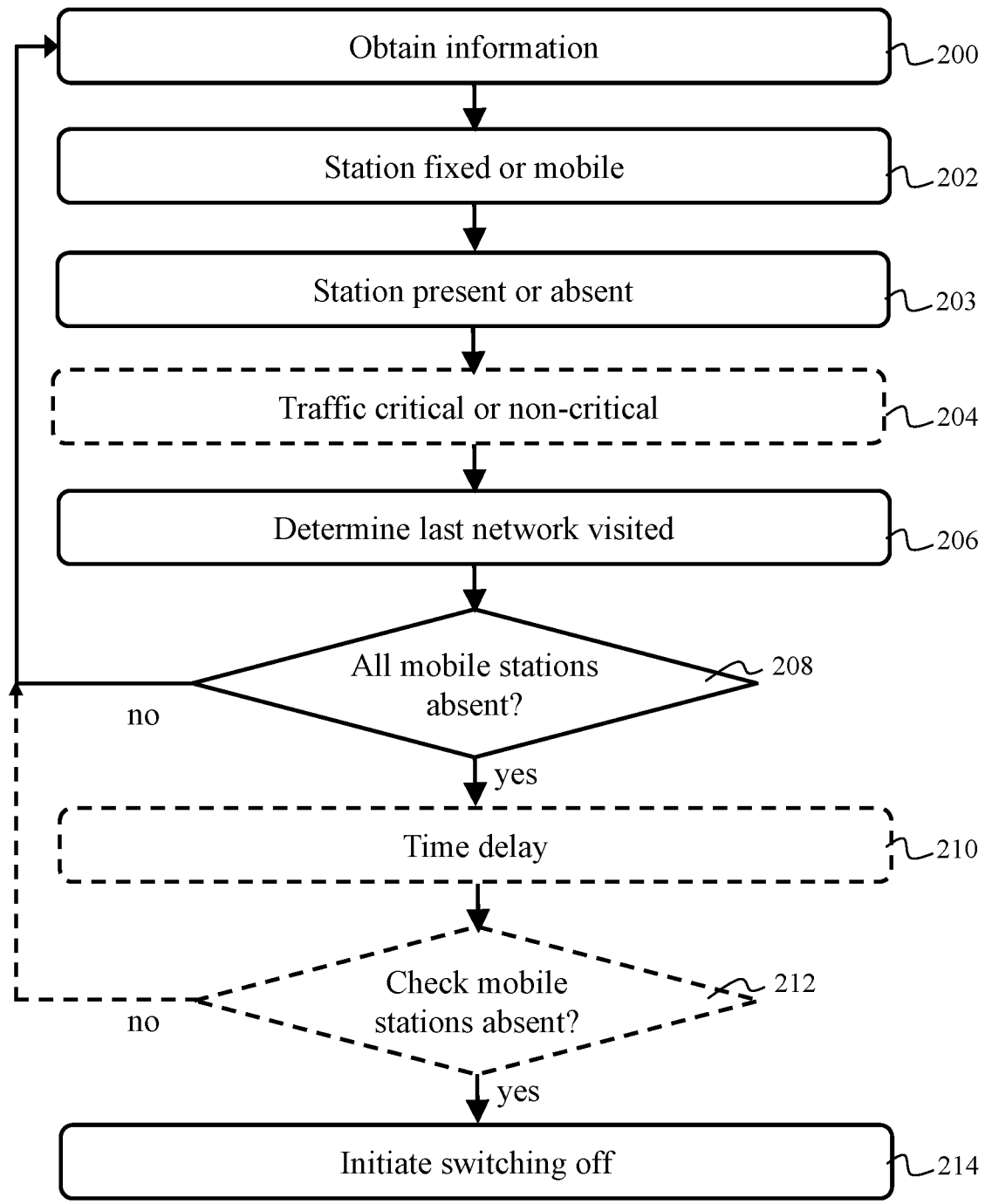
FIG. 2B illustrates schematically a method for switching off at least part of the communication network according to various embodiments, the switching-off method being performed by a master device of the communication network.

FIG. 2B illustrates schematically the method for switching off at least part of the communication network 100, implemented by the master device 110, according to various embodiments.

In a first step 200, the master device 110 obtains, from the access points AP 130, information relating to the stations 150 identified in the communication network 100. For each station, the information relating to the stations 150 identified in the communication network 100 comprises an identification of the station 150 and association information for the station 150. The association information for the station 150 comprises an identification of the fronthaul network 140 with which said station 150 has thus associated itself or an identification of the fronthaul network 140 from which said station 150 has just disassociated itself. In the case where the station 150 is dissociated from any fronthaul network 140, the association information enables the master device 110 to identify the last fronthaul network 140 with which the station 150 was associated. The information relating to the stations 150 identified in the communication network 100 and associated with a fronthaul network 140 further comprises a received signal level, coming from each station 150, through the access point AP 130, such as an RSSI (received signal strength indicator) and information representing a flow rate of data exchanged between the station 150 and the communication network 100 such as for example a number of packets sent and/or received by the station 150, a quality of service marker indicating whether the station 150 is managing traffic having a voice and/or video quality of service. The master device 110 can furthermore obtain information indicating whether incoming connection requests are transmitted to the station 150. This may for example be the case for a camera that a user is seeking to control remotely. For each station 150 associated with a fronthaul network 140, the master device 110 periodically, and throughout the duration of association of the station 150, obtains the received signal level information, the information representing a flow rate of data exchanged and the information indicating whether incoming connection requests are transmitted to the station 150.

In a following step 202, the master device 110 determines, for each station 150, whether said station 150 is fixed or mobile. A station 150 is considered to be mobile if a variation in its signal level or RSSI is above a threshold, and fixed otherwise.

According to one embodiment, the variation in the signal level is determined by calculating the standard deviation of a set of averages of the signal level, each average being calculated over a period of predefined duration and distinct from the other periods. For example, the signal level is averaged over a plurality of periods of time the durations of which may be one minute, five minutes, ten minutes, fifteen minutes, thirty minutes and one hour. The standard deviation of all these averages is then compared with a threshold, for example with the threshold of 3%. The corresponding station 150 is considered to be mobile if the standard deviation of the averages is higher than said threshold and fixed otherwise.

According to an alternative embodiment, the time is divided up as from the moment when the station 150 associates itself with a fronthaul network into periods equal to a predefined duration. An average value M of the signal level is calculated for each of said periods. An instantaneous value of the signal level denoted RSSI_c, received at each period end, is compared with the average value M calculated over the period preceding said given instant. If the instantaneous value of the signal level is lower than a difference consisting of the average value M minus a first threshold S1 or if the instantaneous value of the signal level is higher than a sum of the average value M and of a second threshold S2, then the station 150 is considered to be mobile. Otherwise the station 150 is considered to be fixed.

In other words, a station 150 is considered to be mobile if at least one of the following conditions is met: $RSSI\_c < M - S1$, or $RSSI\_c > M + S2$.

At the moment when a station 150 associates itself with a fronthaul network 140 and until an analysis of the variation in the signal level makes it possible to determine whether said station 150 is fixed or mobile, the station 150 is considered to be fixed if it was fixed at the moment of its previous disassociation from one of the fronthaul networks 140 and considered to be mobile if it was mobile at the moment of its previous disassociation from one of the fronthaul networks 140. If the station 150 connects for the first time to the communication network 100 and has therefore never been identified in the communication network 100, said station 150 is considered to be mobile by default. This is the case for example with a new station introduced into the network by a user.

In a step 203, the master device 110 determines, for each station 150, whether the station 150 is present or absent. In other words, the master device 110 determines, from the association information, whether at a particular instant a station 150 is associated with a fronthaul network 140 or dissociated from any fronthaul network 140.

In an optional step 204, the master device 110 determines, for each fixed station 150, whether said station 150 is managing critical or non-critical traffic according to a data flow rate or according to connection requests intended for said station 150. A fixed station 150 is managing critical traffic if it fulfils at least one of the following criteria. A first criterion is that the station 150 is managing traffic having voice and/or video as its quality of service, this quality of service being identified either at the MAC layer, or at the IP layer, or at the application originating this traffic in the case of use of the Deep Inspection algorithm. This is because a voice and/or video quality of service requires less latency and/or more flow rate than an exchange of information with an email server intended to check the presence of new messages. A second criterion is that the station 150 sends or receives a number of packets above a given threshold, such as for example a threshold of ten packets sent or received per second. A third criterion is that the connection requests are transmitted to the station 150. The third criterion may be verified by the master device 110 by analysing a table of incoming and outgoing connections underway in the communication network 100, also referred to as a conntrack table. A conntrack table may be transmitted by each access point AP 130 to the master device 110. In an alternative embodiment, a conntrack table may be communicated to the master device 110 by an entity responsible for connections such as a gateway external to the communication network 100. The master device 110 may determine over time whether the traffic of a station 150 is critical or non-critical according to the data received. This information is in particular used by the method described in relation to FIGS. 3B and 4.

In a step 206, the master device 110 determines, for each mobile and absent station 150, the last fronthaul network 140 visited by said station 150. Each fronthaul network 150 of the communication network 100 can be identified by a unique indicator, such as for example the BSSID (basic service set identifier) for the Wi-Fi/IEEE 802.11 wireless network technology. Such a last fronthaul network 140 visited by a station 150 is said to be a critical fronthaul network 140. It should be noted that, when a mobile station 150 associates itself with a fronthaul network 140, for example when a mobile station 150 is determined as being present at the step 203, the master device 110 deletes, from said station 150, the last fronthaul network 140 visited that was determined previously, if there was one. The fronthaul network 140 in question is then no longer considered to be critical, unless it is determined as being the last fronthaul network 140 visited by another station 150. The critical fronthaul networks 140 correspond, at a given moment, to all the last fronthaul networks 140 visited determined for all the mobile and absent stations 150 of the communication network 100.

In a particular embodiment, the master device 110 undertakes a permanent monitoring of the stations 150 and thus determines, as it collects information coming from access points AP 130, whether a station 150 is fixed or mobile, present or absent, optionally whether it is managing critical or non-critical traffic and furthermore determines the last fronthaul network 140 visited by an absent mobile station. The master device 110 may furthermore identify a change in status, for example if a mobile station 150 becomes fixed or vice versa, if critical traffic managed by a station 150 becomes non-critical, or if a station 150 present becomes absent. In an alternative embodiment, the master device 110 undertakes a periodic monitoring of the stations 150, for example every ten seconds.

In the step 208, the master device 110 identifies whether all the mobile stations 150 are absent. If at least one mobile station 150 is present, the master device 110 reiterates the steps 200 to 206. If there is no longer any station 150 present or if only fixed stations 150 are present, the master device 110 performs a step 214.

In a step 214, the master device 110 initiates a phase of switching off at least one non-critical fronthaul network 140. As stated in relation to the step 206, a fronthaul network 140 is considered to be critical at a given moment if it forms part of the last fronthaul networks 140 visited determined for all the mobile stations 150 absent from the communication network 100.

In a particular embodiment, the master device 110 initiates the switching-off phase 214 after a time-delay period, in a step 210, commencing as soon as the last mobile station 150 present disassociates itself from a fronthaul network 140. At the end of the time-delay period, the master device 110 checks, in a step 212, that every station 150 associated with a fronthaul network 140 of the communication network 100 is fixed. If such is the case, the master device 110 initiates the switching-off phase. In the contrary case, for example if a station 150 that is absent and considered to be mobile before the previous disassociation thereof sends a request for association with a fronthaul network 140 of the communication network 100 or if a station 150 that is fixed and present has become mobile, the master device 110 does not initiate the switching-off phase and the steps 200 to 206 are reiterated. Thus the power consumption of the communication network 100 and the sending of electromagnetic waves can be limited while guaranteeing optimum use adapted to the requirements of a user.

Figure 3A:
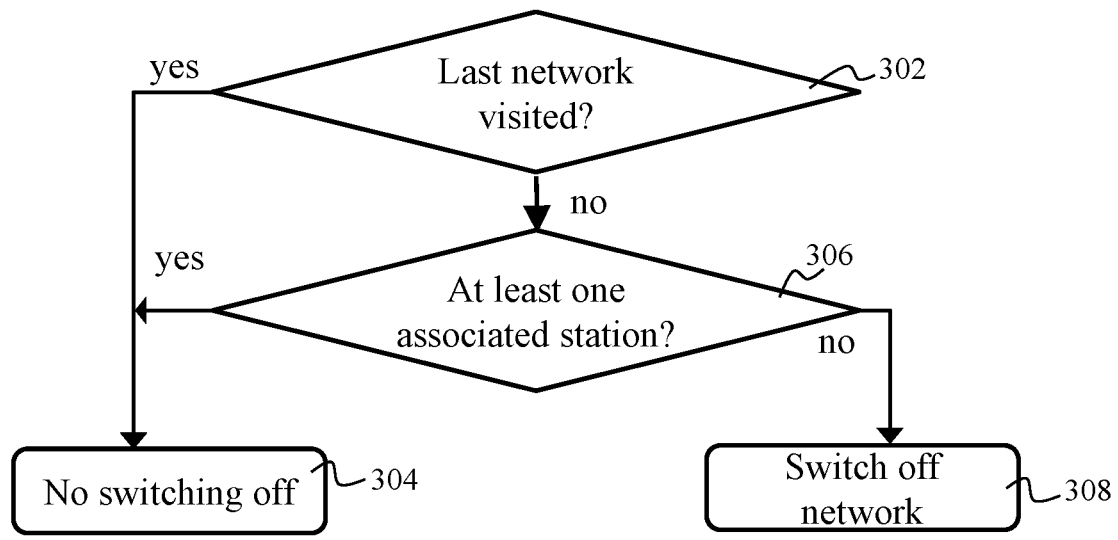
FIG. 3A illustrates schematically steps of a switching-off phase of the switching-off method according to a first embodiment.

FIG. 3A illustrates schematically steps of the switching-off phase of the switching-off method according to a first embodiment. Said steps are performed by the master device 110 when the switching off of at least one fronthaul network 140 is initiated, or in other words during the step 214 described above in relation to FIG. 2B.

During the switching-off phase, the master device 110 identifies, for each fronthaul network 140 of the communication network 100, whether or not it must be switched off.

In a step 302, the master device 110 identifies, for each fronthaul network 140, whether said fronthaul network 140 is critical. If such is the case, a step 304 is performed and the fronthaul network 140 is not switched off. Otherwise a step 306 is performed.

At the step 306, the master device 110 identifies, for each remaining fronthaul network 140, whether at least one fixed station 150 is associated with said fronthaul network 140. If such is the case, the step 304 is performed and the fronthaul network 140 is not switched off. Otherwise a step 308 is performed and the fronthaul network 140 is switched off. In the step 308, the master device sends a switching-off instruction to the access point AP 130 that manages the fronthaul network 140 in question so that said access point AP 130 switches off said fronthaul network 140, typically by stopping sending beacons from said fronthaul network 140 or completely stopping the radio chipset responsible for said fronthaul network 140 if it is the only fronthaul network 140 present in said radio chipset.

At the step 304, the master device 110 may furthermore identify each fronthaul network 140 that is not switched off and must remain switched on.

Thus the switching off of the fronthaul networks 140 is adapted according to the temporary requirements of the associated stations 150. In addition, the reassociation of mobile stations 150 is facilitated in zones where said mobile stations 150 have disassociated themselves for the last time, which correspond to the zones where the probability of reassociation is the highest, as is the case for example for a fronthaul network 140 that is close to the entrance to a dwelling.

Figure 3B:
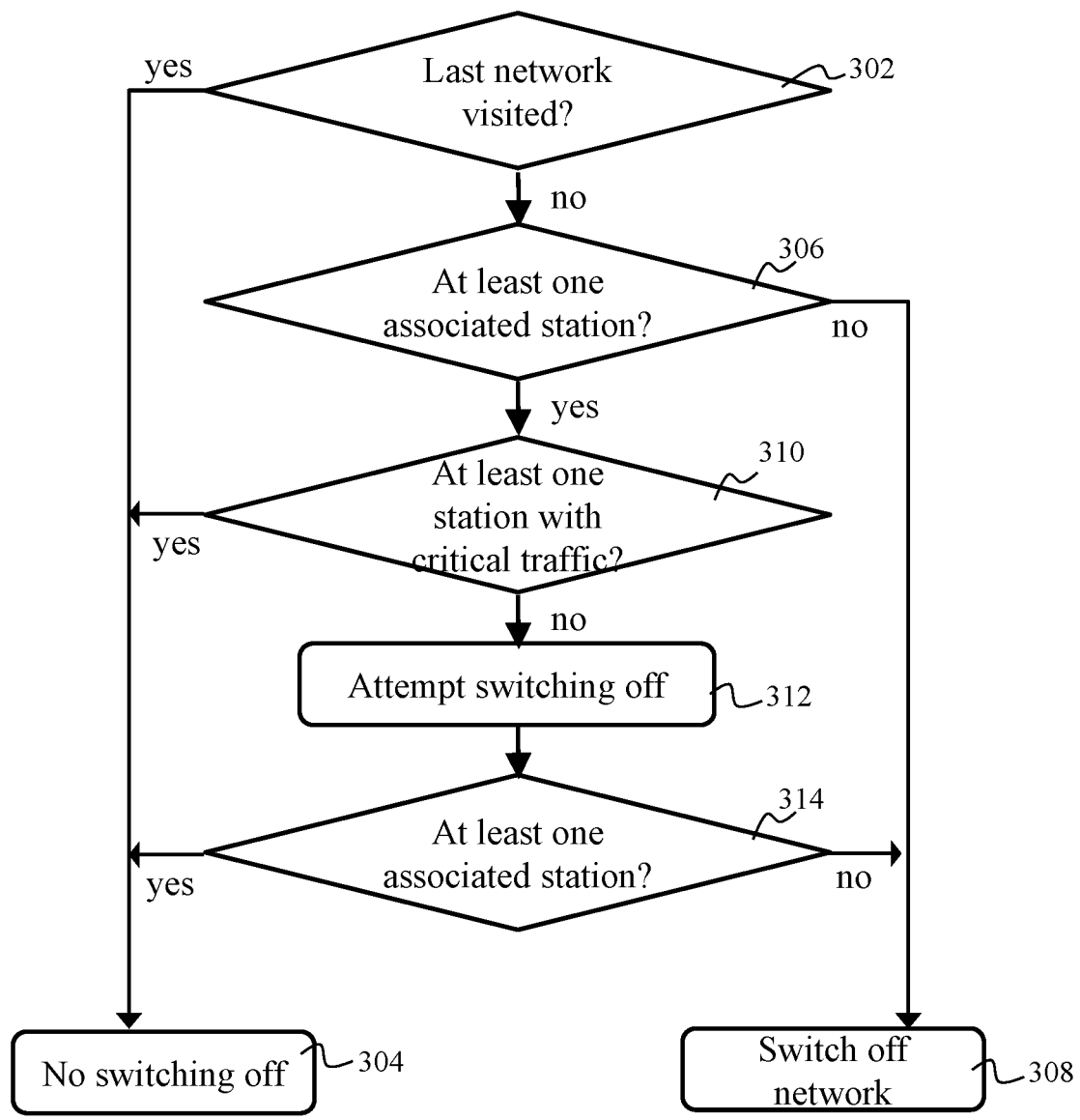
FIG. 3B illustrates schematically steps of the switching-off phase of the switching-off method according to a second embodiment.

FIG. 3B illustrates schematically steps of the switching-off phase of the switching-off method according to a second embodiment.

In the step 302 presented above in relation to FIG. 3A, the master device 110 identifies whether a fronthaul network 140 is a critical fronthaul network 140. If such is the case, the step 304 is performed and the fronthaul network 140 in question is not switched off. In the contrary case, the step 306 is performed.

At the step 306, previously described in relation to FIG. 3A, the master device 110 identifies, for each non-critical fronthaul network 140, whether at least one station 150 is associated with said fronthaul network 140. If no station 150 is associated, the step 308 is performed and the fronthaul network 140 in question is switched off. If at least one station 150 is associated with said fronthaul network 140, a step 310 is performed.

In the step 310, the master device 110 identifies, for each non-critical fronthaul network 140, whether, among the associated station or stations 150, at least one station 150 is managing critical traffic. If at least one station 150 associated with a fronthaul network 140 is managing critical traffic, the step 304 is performed and said fronthaul network 140 is not switched off. Thus a station 150 that is managing traffic at a high rate, such as for example a camera that is exchanging video data, can remain associated with the fronthaul network 140 with which the station 150 has preferentially associated itself, and therefore which has a high probability of providing the best conditions for access to said station 150.

In the contrary case, if, for a fronthaul network 140, no station 150 that is associated therewith is managing critical traffic, a step 312 is performed.

At the step 312, the master device 110 makes an attempt at switching stations 150 that are associated with the fronthaul networks 140 concerned, i.e. the fronthaul networks 140 that are not switched off, which are not considered to be critical at the step 302 and with which only stations 150 managing non-critical traffic are associated. The switching attempt made by the master device 110 aims to transfer the stations 150 associated with said fronthaul networks 140 concerned to another fronthaul network 140 that is not switched off.

In order to make the switching attempt, the master device 110 sends a transfer instruction to the access point AP 130 managing the fronthaul network 140 concerned. On reception of the transfer instruction, said access point AP 130 can use a disassociation frame intended for the station 150 in order to force the station 150 to disassociate itself from the fronthaul network 140, and then identify the station 150 as being forbidden access to said fronthaul network 140, for example by entering it in a blacklist. A join request sent by the station 150 to said fronthaul network 140 will be refused or ignored by said fronthaul network 140. Consequently the station 150 will seek to join another fronthaul network 140 within range of said station 150. The master device 110 can furthermore check that each station 150 forced to disassociate itself has reassociated with another fronthaul network 140. If such is not the case, for example when a station 150 does not manage to reassociate itself with another fronthaul network 140, said station 150 is deleted from the blacklist. Alternatively, the access point AP 130 can use an environment measurement frame in accordance with IEEE 802.11k (Measurement Request/Report) making it possible to identify a fronthaul network 140 that is not switched off within range of said station 150 and/or a transition frame specific to IEEE 802.11v (BSS Transition Management Request/Report) making it possible to request a station 150 to transfer to such a fronthaul network 140.

Alternatively, in order to make the switching attempt, the master device 110 counts the number of stations 150 to be transferred and then sends a switching-off instruction to the access point AP 130. The master device 110 next checks that each station 150 previously associated with the fronthaul network 140 that has been switched off has associated itself with another fronthaul network 140 that is not switched off in the communication network 100 and, if such is not the case, then the master device 110 sends a switching-on instruction to the access point AP 130.

In a particular embodiment, when an attempt at switching a station 150 results in the transfer of said station 150 from a fronthaul network 140 referred to as the original fronthaul network 140 to another fronthaul network 140, the master device 110 assigns to said station 150 a transfer indicator comprising the identification of the original fronthaul network. Thus it is possible to keep a track of a transfer of a station 150 made during the switching-off phase.

When the attempt at switching each station 150 from a fronthaul network 140 has been made, the method continues at a step 314. In the step 314, the master device 110 identifies whether at least one station 150 is associated with said fronthaul network 140. If such is the case, this means that the switching attempt has failed for at least one station 150 and the step 304 is performed, said fronthaul network 140 not being switched off. In the contrary case, if no station 150 is associated with the fronthaul network 140, the step 308 is performed and the fronthaul network 140 is switched off. In the contrary case, if no station 150 is associated with the fronthaul network 140, the step 308 is performed and the fronthaul network 140 is switched off. In this way, it is possible to reduce the power consumption of the communication network 100 by maximising the number of fronthaul networks 140 switched off while keeping sufficient access and service for the user. It is thus possible to switch off a fronthaul network 140 normally used by a station 150 if said fronthaul network 140 can easily be replaced by another fronthaul network 140 without this impairing the quality of service provided to the user.

According to a particular embodiment, the master device 110 determines an order of switching off that defines in what order the switching attempts are made and in what order the fronthaul networks 140 are switched off. For this purpose, the master device 110 determines an order of the non-critical fronthaul networks 140 with which only stations 150 managing non-critical traffic are associated. The order of said fronthaul networks 140 is determined according to the number of stations 150 associated with each of said fronthaul networks 140 and in an increasing order. In other words, an order that increases with the number of associated stations 150 is attributed to each of said fronthaul networks 140. In the order determined, the first fronthaul network 140 thus presents the smallest number of associated stations 150 and the last fronthaul network 140 presents the greatest number of associated stations. If two fronthaul networks 140 present the same number of associated stations 150, an arbitrary classification may be made.

The master device 110 then makes the attempts at switching the stations 150 in the order of the fronthaul networks 140 with which they are associated. Thus the master device 110 first of all makes an attempt at switching the stations 150 associated with the first fronthaul network 140. If all the stations 150 associated with said first fronthaul network 140 are transferred, the first fronthaul network 140 is switched off. Otherwise the fronthaul network 140 is left switched on. The master device then proceeds in the same way for the second fronthaul network 140 and then successively for each fronthaul network 140 in the order determined.

Figure 4:
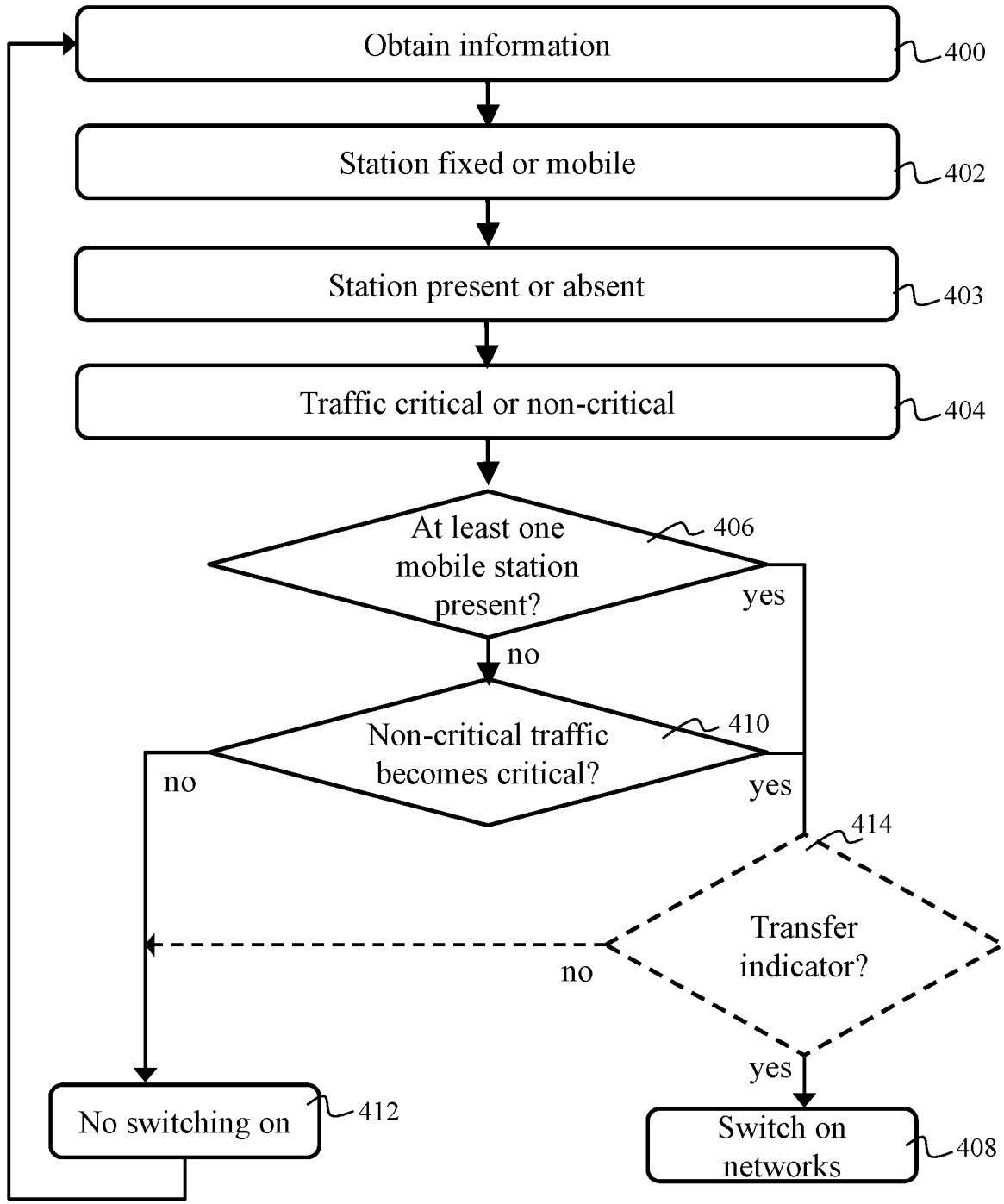
FIG. 4 illustrates schematically steps of the switching-off method subsequent to the switching-off phase.

FIG. 4 illustrates schematically steps of the switching-off method that are implemented by the master device 110 subsequently to the switching-off phase. Said steps are therefore performed after the steps described in relation to FIG. 3A or 3B have been performed and when at least one of the fronthaul networks 140 is switched off.

The master device 110 firstly performs the steps 400, 402, 403 and 404 similar to the respective steps 200, 202, 203 and 204 previously described in relation to FIG. 2B. Thus the master device 110 obtains information from the access points AP 130 and, from said information, determines for each station 150 whether it is mobile or fixed, whether it is present or absent and, for each fixed station 150, determines whether it is managing critical or non-critical traffic.

In a step 406, the master device 110 detects whether at least one station 150 is mobile and present. The switching-off phase being initiated when all the mobile stations 150 are absent, a station 150 that is mobile and present can be detected at the step 406 in the following cases: either a station 150 previously considered to be mobile sends a join request to a fronthaul network 140, or a fixed station 150 present becomes mobile or a station 150 associates itself for the first time with a fronthaul network 140 of the communication network 100 and is therefore considered to be mobile by default. If at least one mobile station 150 is detected, a step 408 is performed.

In the step 408, the master device 110 sends a switching-on instruction to all the access points AP 130 no longer emitting a fronthaul network 140 requesting switching on all the fronthaul networks 140 switched off.

If no mobile station 150 is detected at the step 406, a step 410 is performed.

In the step 410, the master device 110 detects, for each station 150 managing non-critical traffic at the moment when the extension phase is initiated, if the traffic managed by said station 150 becomes critical. In other words, the master device identifies a change to the traffic managed by each station 150 and if said traffic changes from a non-critical to a critical status. If no change is detected, a step 412 is performed.

In the step 412, no fronthaul network 140 is switched on and the master device reiterates the steps 400 to 406.

If, for a station 150, the traffic managed by said station 150 changes from non-critical to critical, the step 408 is performed and all the fronthaul networks 140 switched off are switched on again.

According to an alternative embodiment, if the traffic of a station 150 changes from non-critical to critical, a step 414 is performed prior to the step 408. In the step 414, the master device 110 identifies, for each station 150 the traffic of which has changed from non-critical to critical, whether a transfer indicator is attributed to said station 150. As described above in relation to the step 312 of FIG. 3, a transfer indicator is attributed to a station 150 when said station 150 is transferred from its original fronthaul network 140 to another fronthaul network 140 following a switching attempt. If no transfer indicator is attributed, the step 412 is performed and the fronthaul networks 140 switched off are not switched on again. If a transfer indicator is attributed to the station 150, the step 408 is performed and all the fronthaul networks 140 switched off are switched on again. Thus it is possible to adapt the switching-on of the fronthaul networks 140 according to the change in the traffic of a station 150. In addition, it is possible to avoid switching on all the fronthaul networks 140 if a station 150 has remained associated with its original fronthaul network 140 during the switching-off phase, the original fronthaul network 140 being considered to provide the best conditions for connection, from a point of view of transfer rate for example, to a station 150.

Alternatively, if at step 414 a transfer indicator is identified for a fixed station 150 the traffic of which changes from non-critical to critical, the master device 110 sends a switching-on instruction solely to the access point AP 130 that manages the original fronthaul network 140 of the station 150 in question. Then, if fronthaul networks 140 are still switched off, the step 400 is reiterated. Thus it is possible to limit the switching-on of the fronthaul networks 140 solely to the fronthaul networks 140 that are useful to the user.

When the step 408 is performed, the master device 110 deletes all the transfer indicators that have been able to be attributed.

Following the step 408, the master device 110 can reiterate the step 200 described previously.

According to a particular embodiment (not shown in the figures), the master device 110, subsequently to the switching-off phase, performs a step of listening to the stations 150. The listening step may be performed when at least one fronthaul network 140 is switched off, for example following the step 412 periodically. In the listening step, the master device 110 sends a listening instruction to at least one access point AP 130 managing a switched-off fronthaul network 140. On reception of the listening instruction, the access point AP 130 switches on the fronthaul network 140 in a listening mode only, or in other words the access point AP 130 switches on only a reception chain and not a transmission chain, enabling the access point AP 130 to receive messages but not to send any. The access point AP 130 can thus detect whether any join requests are sent coming from stations 150 that are not associated but are authorised to access the communication network, or in other words stations 150 that do not manage to associate with the fronthaul networks 150 left switched on. If such is the case, the step 408 is performed and the fronthaul networks 140 are switched on. Alternatively, only the fronthaul network 140 managed by said access point AP 130 is switched on.

Thus it is possible to enable a fixed station 150 that was absent at the time of the switching-off phase to reassociate with the communication network 100 if only switched-off fronthaul networks 140 are potentially accessible to it.

Figure 5:
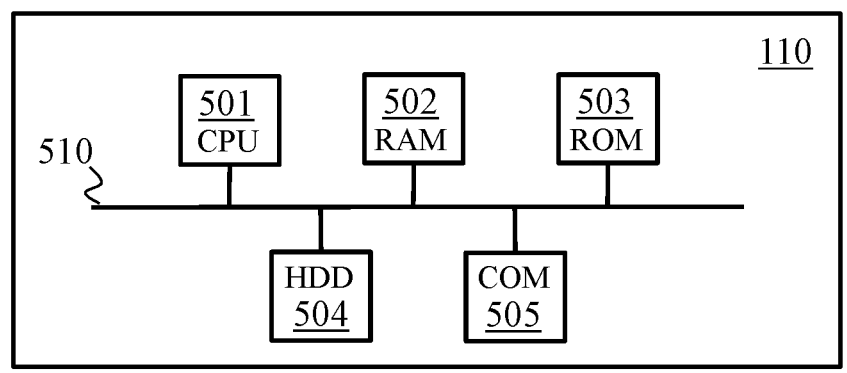
FIG. 5 illustrates schematically the hardware architecture of the master device.

FIG. 5 illustrates schematically the hardware architecture of the master device 110. The master device 110 then comprises, connected by a communication bus 510; a processor or CPU (central processing unit) 501; a random access memory RAM 502; a read only memory ROM 503; a storage unit 504, such as a hard disk HDD (hard disk drive), or a storage medium reader, such as an SD (Secure Digital) card reader; and an interface COM 505 for communicating with the access points AP 130.

The processor CPU 501 is capable of executing instructions loaded in the RAM 502 from the ROM 503, from an external memory (such as an SD card), from a storage medium, or from a communication network. When the master device 110 is powered up, the processor CPU 501 is capable of reading instructions from the RAM 502 and executing them. These instructions form a computer program causing the implementation, by the processor CPU 501, of all or some of the steps described here in relation to the master device 110.

All or some of said steps can thus be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit). In general terms, the master device 110 thus comprises electronic circuitry configured to implement all or some of the steps described here in relation to the master device 110.

Thus all or some of the algorithms and steps described here in relation to the master device 110 can be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit). It should be noted that each access point AP 130 can follow the same hardware architecture.

The invention claimed is:

1. A method for switching off at least part of a communication network, the communication network comprising a plurality of access points coordinated in a centralized manner by a master device, the access points and the master device being interconnected with each other by a backhaul network, each access point of the plurality of access points managing a respective wireless network known as a fronthaul network, a station being able to be associated with one of the fronthaul networks of the communication network, the method being implemented by the master device wherein the method comprises:

obtaining from each access point at least one item of information relating to each station in the communication network associated with said access point or which is disassociated from said access point, said at least one item of information obtained comprising association information indicating with which fronthaul network the station is associated or from which fronthaul network the station is disassociated, and further comprising information representing a signal level received by the access point coming from the station, determining, for each station in the communication network, whether the station is associated with one of the fronthaul networks or disassociated from any fronthaul network according to the association information, determining, for each station in the communication network, whether the station is mobile or fixed according to a variation in the received signal level coming from the station, determining, for each mobile station dissociated from any fronthaul network, the last fronthaul network with which the station was associated according to the association information, said last fronthaul network being said to be critical, initiating a phase of switching off at least one non-critical fronthaul network when all the mobile stations are disassociated from any fronthaul network, wherein the master device initiates the switching-off phase after a time-delay period commencing as soon as the last station determined as being mobile is determined as being disassociated from any fronthaul network.

2. The method according to claim 1, wherein determining, for each station in the communication network, whether the station is mobile or fixed according to a variation in the received signal level comprises: comparing a standard deviation of a set of a plurality of averages of the received signal level with a predefined threshold, each average being calculated over a period with a duration different from the other periods and determining that the station is mobile in the case where the standard deviation of all the averages is higher than said threshold and that the station being fixed otherwise.

3. The method according to claim 1, wherein determining, for each station in the communication network, whether the station is mobile or fixed according to a variation in the received signal level comprises: comparing an instantaneous value of the received signal level at a given instant with an average value of the received signal level calculated over a period of time preceding said given instant and determining that said station is mobile in the case where the instantaneous value of the received signal level is lower than a difference of the average value minus a first predefined threshold or in the case where the instantaneous value of the received signal level is higher than a sum of the average value and a predefined second threshold.

4. The method according to claim 1, wherein the phase of switching off at least one non-critical fronthaul network comprises:

switching off a non-critical fronthaul network if no station is associated with said non-critical fronthaul network.

5. The method according to claim 4, wherein said at least one item of information obtained also comprises information representing a data rate of data exchanged by said station with an access point and/or information representing a quality of service of the data exchanged by said station with an access point and/or information representing a connection request intended for the station, the method comprises:

determining, for each fixed station in the communication network, whether said station is managing critical or non-critical traffic, according to the information representing the data rate and/or the information representing a quality of service of the data exchanged by said station with an access point and/or the information representing a connection request intended for the station, and wherein the switching-off phase comprises:

for each non-critical fronthaul network with which only one or more fixed stations managing non-critical traffic are associated, making an attempt at switching said fixed stations in order to transfer them from their original fronthaul network to another not switched-off fronthaul network.

6. The method according to claim 5, wherein determining, for each fixed station in the communication network, whether the station is managing critical or non-critical traffic comprises determining that said fixed station is managing critical traffic in the case where at least one following criterion is met:

said station is managing traffic having voice and/or video as a quality of service;

the number of packets sent and/or received by said station is above a given threshold;

connection requests are transmitted to said station.

7. The method according to claim 5, wherein the attempt at switching the stations is made, for the stations associated with the non-critical fronthaul networks with which only one or more fixed stations managing non-critical traffic are associated, successively in an order of said fronthaul networks that increases with the number of stations associated with said fronthaul networks, so that switching attempts are first of all made for the stations associated with the fronthaul network for which the number of associated stations is smaller before being made for the stations associated with a fronthaul network for which the number of associated stations is greater.

8. The method according to claim 4, further comprising, after at least one non-critical fronthaul network has been switched off, switching on the fronthaul networks if a station in the communication network is determined as being mobile and associated with a fronthaul network, any station that connects for the first time to the communication network while associating with one of the fronthaul networks being considered to be mobile by default.

9. The method according to claim 8, wherein the switching-off phase further comprises:

attributing a movement indicator to a fixed station transferred during an attempt at switching from its original fronthaul network to another fronthaul network that is not switched off, wherein the master device, after at least one non-critical fronthaul network has been switched off:

switches on all the fronthaul networks in the case where the traffic managed by the fixed station passes from non-critical to critical and if a transfer indicator is attributed to said fixed station.

10. The method according to claim 8, wherein the switching-off phase further comprises:

attributing a transfer indicator to a fixed station transferred during an attempt at switching from their original fronthaul network to another fronthaul network that is not switched off, wherein the master device, after at least one non-critical fronthaul network has been switched off:

switches on only the original fronthaul network of said fixed station in the case where the traffic managed by said fixed station passes from non-critical to critical and if a transfer indicator is attributed to said fixed station.

11. The method according to claim 1, comprising: sending a listening instruction to an access point managing a switched-off fronthaul network so as to switch on said fronthaul network in listening mode only, and, in the case where at least one association request coming from a non-associated station is received by said access point, switching on said fronthaul network.

12. A master device in a communication network, the communication network comprising a plurality of access points coordinated in a centralised manner by the master device, the access points and the master device being interconnected with each other by a backhaul network, each access point managing a wireless network known as a fronthaul network, a station being able to associate itself with one of the fronthaul networks of the communication network, the master device wherein the master device comprises electronic circuitry configured for:

obtaining from each access point at least one item of information relating to each station in the communication network associated with said access point or which is disassociated from said access point, said at least one item of information obtained comprising association information indicating with which fronthaul network the station is associated or from which fronthaul network the station is disassociated, and further comprising information representing a signal level received by the access point coming from the station, determining, for each station in the communication network, whether the station is associated with one of the fronthaul networks or disassociated from any fronthaul network according to the association information, determining, for each station in the communication network whether the station is mobile or fixed according to a variation in the received signal level coming from the station, determining, for each mobile station dissociated from any fronthaul network, the last fronthaul network with which the station was associated according to the association information, said last fronthaul network being said to be critical, initiating a phase of switching off at least one non-critical fronthaul network (140) when all the mobile stations are disassociated from any fronthaul network, the switching-off phase being initiated after a time-delay period commencing as soon as the last station determined as being mobile is determined as being disassociated from any fronthaul network.

13. A non-transitory information storage medium embodying a computer program that comprises instructions for implementing, by a processor, the method according to claim 1, when said computer program is executed by said processor.

* * * * *